US006952765B2

(12) United States Patent
Nakamura (10) Patent No.: US 6,952,765 B2
(45) Date of Patent: Oct. 4, 2005

(54) PROCESSOR USING A PREDICTED RESULT IN EXECUTING A SUBSEQUENT INSTRUCTION REGARDLESS OF WHETHER A PREDICTED VALUE IS TRUE OR FALSE

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 10/046,982

(22) Filed: Jan. 17, 2002

(65) Prior Publication Data

US 2002/0152368 A1 Oct. 17, 2002

(30) Foreign Application Priority Data

Apr. 12, 2001 (JP) ........................................ 2001-113931

(51) Int. Cl.[7] ................................................ G06F 9/44
(52) U.S. Cl. ....................................................... 712/226
(58) Field of Search ................................ 712/226, 239, 712/240

(56) References Cited

U.S. PATENT DOCUMENTS 5,996,060 A  11/1999  Mendelson et al.

FOREIGN PATENT DOCUMENTS

JP  2001-56971  2/2000

OTHER PUBLICATIONS

M.H. Lipasti, J.P. Shen, Exceeding the dataflow limit via value prediction, Dec. 2–4, 1996, Microarchitecture, 1996. MICRO–29. Proceedings 29th Annual IEEE/ACM International Symposium, pp. 226–237.*

F. Gabbay, A. Mendelson, Can program profilling support value prediction?, Dec. 1–3, 1997, Microarchitecture, 1997 Prceedings. Thirtieth Annual IEEE/ACM International, pp. 270–280.*

* cited by examiner

Primary Examiner—Eddie Chan
Assistant Examiner—Tonia L. Meonske
(74) Attorney, Agent, or Firm—Mattingly, Stanger, Malur & Brundidge, P.C.

(57) ABSTRACT

A processor is arranged to make it possible to specify an instruction for which value prediction is thought to enhance program execution performance and execute the instruction and enhance the accuracy of prediction when carrying out value prediction. The processor is provided with an instruction cache to store instructions to which a value prediction field and a value prediction method field are attached. Prior to or in concurrence with fetching and executing an instruction by its execution unit, the execution result value predicted by a value predictor designated by the contents of the value prediction method field of the instruction is output. Only when the value prediction field contains '1,' the predicted value is stored into the register and used in executing a subsequent instruction. The predicted value for an instruction with its value prediction field containing '0' is nullified. For each instruction, the result of prediction made by the value predictor is compared with the result of executing the instruction by the execution unit. When the comparison is a mismatch, the result of prediction stored in the register is cleared and the data contents of the value prediction field or value prediction method field of the instruction in the cache memory are updated.

6 Claims, 11 Drawing Sheets

INSTRUCTION CACHE (20)

| INSTRUCTION | VALUE PREDICTION FIELD |
|---|---|
| INSTRUCTION | VALUE PREDICTION FIELD |
| INSTRUCTION | VALUE PREDICTION FIELD |
| ⋮ | ⋮ |
| INSTRUCTION | VALUE PREDICTION FIELD |

INSTRUCTION CACHE (20)

| INSTRUCTION | VALUE PREDICTION FIELD | VALUE PREDICTION METHOD |
|---|---|---|
| INSTRUCTION | VALUE PREDICTION FIELD | VALUE PREDICTION METHOD |
| INSTRUCTION | VALUE PREDICTION FIELD | VALUE PREDICTION METHOD |
| ⋮ | ⋮ | ⋮ |
| INSTRUCTION | VALUE PREDICTION FIELD | VALUE PREDICTION METHOD |

| | | | |
|---|---|---|---|
| 0x2020 | xor r1, r1, r1 | :r1=0 | r1 IS ALWAYS 0 |
| | loop : | | |
| 0x2024 | add r2, r1, 0x4 | :r2=r1+4=4 | r2 IS ALWAYS 4 |
| 0x2028 | add r3, r1, 0x8 | :r3=r1+8=8 | r3 IS ALWAYS 8 |
| 0x202C | add r4, r1, 0xC | :r4=r1+12=12 | r4 IS ALWAYS 12 |
| 0x2030 | bc loop | :loop | |

FIG. 11

| | | | |
|---|---|---|---|
| 0x2020 | xor r1, r1, r1 | :r1=0 | THE INITIAL VALUE OF r1 IS 0 |
| | loop : | | |
| 0x2024 | add r1, r1, 0x1 | :r1=r1+1 | r1 INCREASES BY 1 EVERY TIME |
| 0x2028 | add r2, r1, 0x4 | :r2=r1+4 | r2 INCREASES BY 1 EVERY TIME |
| 0x202C | add r3, r1, 0x8 | :r3=r1+8 | r3 INCREASES BY 1 EVERY TIME |
| 0x2030 | add r4, r1, 0xC | :r4=r1+12 | r4 INCREASES BY 1 EVERY TIME |
| 0x2034 | bc loop | :loop | |

FIG. 12

```
0x2020    xor r1, r1, r1       : r1=0
0x2024    add r1, r1, 0x1      : r1=r1+1=1    THE INITIAL VALUE OF r1 IS 1
          loop :
0x2028    mul r1, r1, −0x1     : r1=r1×(−1)   r1 ALTERNATES BETWEEN −1 AND 1
0x202C    add r2, r1, 0x4      : r2=r1+4      r2 ALTERNATES BETWEEN 3 AND 5
0x2030    add r3, r1, 0x8      : r3=r1+8      r3 ALTERNATES BETWEEN 7 AND 9
0x2034    add r4, r1, 0xC      : r4=r1+12     r4 ALTERNATES BETWEEN 11 AND 13
0x2038    bc loop              : loop
```

| | | | |
|---|---|---|---|
| 0x2020 | ld r1, adr | : r1←Mem [adr] | LOAD THE VALUE ON r1 FROM MEMORY |
| | loop : | | |
| 0x2024 | add r2, r1, 0x4 | : r2=r1+4=4 | r2 IS ALWAYS 4 |
| 0x2028 | add r3, r1, 0x8 | : r3=r1+8=8 | r3 IS ALWAYS 8 |
| 0x202C | add r4, r1, 0xC | : r4=r1+12=12 | r4 IS ALWAYS 12 |
| 0x2030 | bc loop | : loop | |

FIG. 15

| | | | |
|---|---|---|---|
| 0x2020 | ld r1, adr | : r1←Mem [adr] | LOAD THE VALUE ON r1 FROM MEMORY |
| | loop : | | |
| 0x2024 | add r1, r1, 0x1 | : r1=r1+1 | r1 INCREASES BY 1 EVERY TIME |
| 0x2028 | add r2, r1, 0x4 | : r2=r1+4 | r2 INCREASES BY 1 EVERY TIME |
| 0x202C | add r3, r1, 0x8 | : r3=r1+8 | r3 INCREASES BY 1 EVERY TIME |
| 0x2030 | add r4, r1, 0xC | : r4=r1+12 | r4 INCREASES BY 1 EVERY TIME |
| 0x2034 | bc loop | : loop | |

FIG. 16

```
0x2020   xor r1, r1, r1    : r1=0
0x2024   ld r1, adr        : r1←Mem[adr]   LOAD THE VALUE TO r1 FROM
         loop :                            MEMORY
0x2028   mul r1, r1, -0x1  : r1=r1×(-1)    r1 ALTERNATES BETWEEN -1 AND 1
0x202C   add r2, r1, 0x4   : r2=r1+4       r2 ALTERNATES BETWEEN 3 AND 5
0x2030   add r3, r1, 0x8   : r3=r1+8       r3 ALTERNATES BETWEEN 7 AND 9
0x2034   add r4, r1, 0xC   : r4=r1+12      r4 ALTERNATES BETWEEN 11 AND 13
0x2038   bc loop           : loop
```

FIG. 17

| OPERATION CODE | RD | RS1 | RS2 | VALUE PREDICTION FIELD | VALUE PREDICTION METHOD | COMPULSORY VALUE PREDICTION |
|---|---|---|---|---|---|---|
| 1 | 2 | 3 | 4 | 5 | 6 | 28 |

FIG. 18

INSTRUCTION CACHE (20)

| INSTRUCTION | VALUE PREDICTION FIELD | VALUE PREDICTION METHOD | COMPULSORY VALUE PREDICTION |
|---|---|---|---|
| INSTRUCTION | VALUE PREDICTION FIELD | VALUE PREDICTION METHOD | COMPULSORY VALUE PREDICTION |
| INSTRUCTION | VALUE PREDICTION FIELD | VALUE PREDICTION METHOD | COMPULSORY VALUE PREDICTION |
| INSTRUCTION | VALUE PREDICTION FIELD | VALUE PREDICTION METHOD | COMPULSORY VALUE PREDICTION |
| ⋮ | ⋮ | ⋮ | ⋮ |
| INSTRUCTION | VALUE PREDICTION FIELD | VALUE PREDICTION METHOD | COMPULSORY VALUE PREDICTION |
| 7 | 8 | 9 | 29 |

PROCESSOR USING A PREDICTED RESULT IN EXECUTING A SUBSEQUENT INSTRUCTION REGARDLESS OF WHETHER A PREDICTED VALUE IS TRUE OR FALSE

BACKGROUND OF THE INVENTION

1. Field of the Invention

The present invention relates to high-performance computer systems. More particularly, the present invention relates to a computer system that predicts a value as the result of execution of an instruction and executes a subsequent instruction, according to the result of the value prediction.

2. Description of Related Art

For shortening program run time with high-performance computer systems, control dependencies and data dependencies are the questions at issue. As regards the control dependencies, a computer predicts the result of execution of a branch instruction and proceeds to execute an instruction predicted as the one to which it will branch before determining what instruction to branch to. In this manner, if the prediction is successful, data-independent instructions can be executed whether or not branch instructions have been executed, so that high-speed program execution can be achieved. If the prediction is unsuccessful, the computer undoes the predicted instruction execution it did and re-executes a proper instruction to which to branch. In this way, the computer has a mechanism for keeping program execution producing correct results.

As regards the data dependencies, on the other hand, there exists a method in which program execution performance is enhanced by predicting a value of data that will be loaded as the result of arithmetic operation or by a data transfer instruction.

Known methods for value prediction include last value prediction by which a computer predicts that the same value as the last one is iterated and stride prediction by which a computer predicts that a data value changes with constant difference from the preceding one. These methods are set forth in U.S. Pat. No. 5,996,060. A further method is known, such as two-level prediction which uses correlation between two values in the past value occurrence pattern.

SUMMARY OF THE INVENTION

Value prediction invalidates data dependencies and enhances program execution performance if it is done correctly. However, if an incorrect value is predicted, there is a possibility of lower performance resulting than the performance when value prediction is not applied.

The methods based on the past value occurrences are ordinarily taken for value prediction. Consequently, it is generally found that the rate of successful value prediction greatly differs among instructions. It is required that value prediction be selectively performed for only instructions for which value prediction succeeds at a high rate.

An object of the present invention is to make it possible to specify an instruction for which value prediction is thought to enhance program execution performance.

Another object of the present invention is to enhance the accuracy of prediction when carrying out value prediction.

In order to achieve the foregoing objects, in one aspect of the present invention, an instruction is arranged to include a field to contain a value that indicates whether to perform value prediction. In another aspect, an instruction cache is arranged such that a field to contain a value that indicates whether to perform value prediction and a field to contain a value that designates a method of value prediction are attached to an instruction to be stored therein. In this manner, an instruction for which value prediction is thought to enhance program execution performance is specified and executed by the processor, thereby prediction with high accuracy is accomplished.

Moreover, an instruction further includes a field to contain a value that indicates whether the result of value prediction is always used. By having this instruction executed by the processor, program execution speedup is achieved.

When a program consisting of instructions including the above-mentioned fields is run, the contents of the fields of the instructions are set, according to the programmed operations.

DESCRIPTION OF THE PREFERRED EMBODIMENTS

Figure 1:
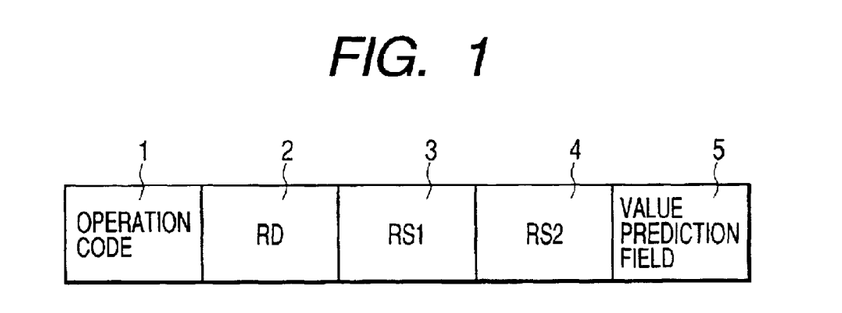
FIG. 1 shows an exemplary instruction format including a value prediction field according to the present invention.

An exemplary instruction format according to a preferred embodiment of the present invention is shown in FIG. 1.

An instruction has a value prediction field (5) in addition to the fields of operation code (1), destination register RD (2), first source register RS1 (3), and second source register RS2 (4). The value prediction field (5) is to exist only in an instruction for which the result of its execution should be predicted and is not required for all instruction sets. The value prediction field (5) consists of one bit. When this bit is 1, value prediction is performed; when 0, value prediction is not performed.

Figure 2:
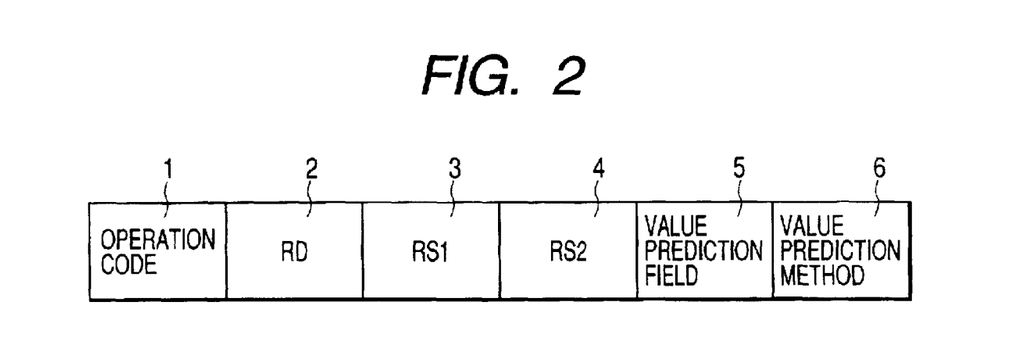
FIG. 2 shows an exemplary instruction format including a value prediction field and a value prediction method field according to the present invention.

FIG. 2 illustrates another instruction format example wherein a value prediction method field (6) is added to the instruction format shown in FIG. 1.

The value prediction method field is to contain one selected out of N pieces of value prediction methods (where N is an integer not less than 1). The value prediction method field also is not required for all instruction sets. It is added to an instruction for which the result of its execution should be predicted and if a plurality of value predictors exist and one of them is able to predict a value to be given by executing the instruction at high probability.

Figure 3:
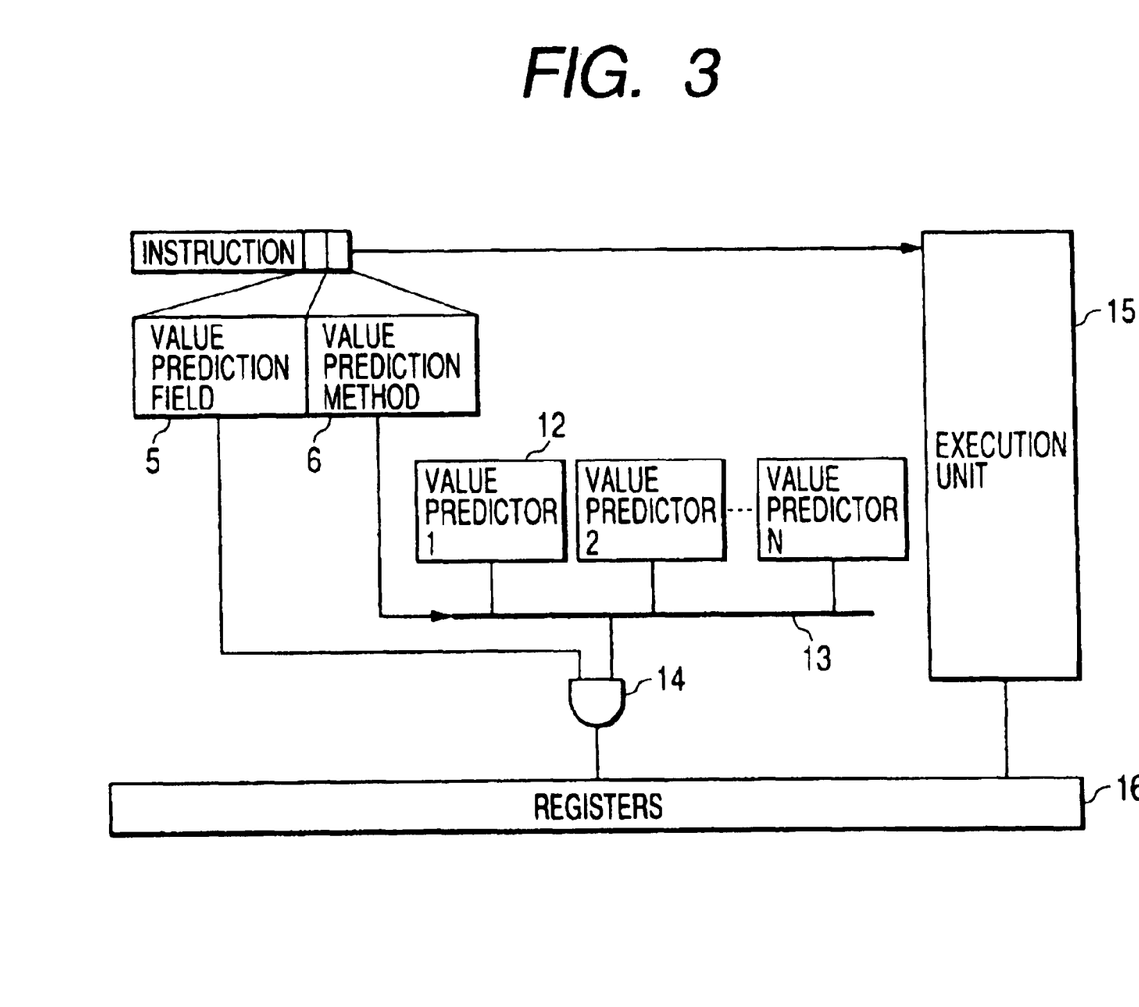
FIG. 3 shows a structural diagram of a computer system in which the instruction format according to the present invention shown in FIG. 2 is used.

FIG. 3 shows a structural diagram of a computer system wherein an instruction including the value prediction field (5) and value prediction method field (6) according to the present invention is executed. Referring to FIG. 3, the operation of the computer system will be described below.

The computer system is provided with N pieces of value predictors (12) based on different value prediction methods and selector (13), value prediction masking gate (14), execution unit (15), and register (16). Execution of an instruction, using the values contained in the fields except the value prediction field (5) and value prediction method field (6) is conducted by the execution unit (15).

The N pieces of value predictors (12) based on different value prediction methods each predict a value that will be given by executing an instruction. Among the results of their prediction, the prediction result produced by the value predictor specified by the value in the value prediction method field (6) is selected by the selector (13). The predicted value thus selected is made effective or ineffective by the logical AND between the value set in the value prediction field (5) and the value prediction masking gate (14). The predicted value, if effective, is stored into the register (16) and used by the execution unit (15) in executing a subsequent instruction. However, when the execution unit (15) executes the instruction for which the value was predicted and stored, if it produces a result different from the predicted value, the register (16) containing the predicted value is cleared and the subsequent instruction executed by using the predicted value is canceled.

Alternatively, the data contained in the value prediction field (5) and value prediction method field (6) can be coded and integrated into the operation code (1). When this is implemented, these fields (5) and (6) do not exist, but their functions are included in the operation code (1).

Figure 4:
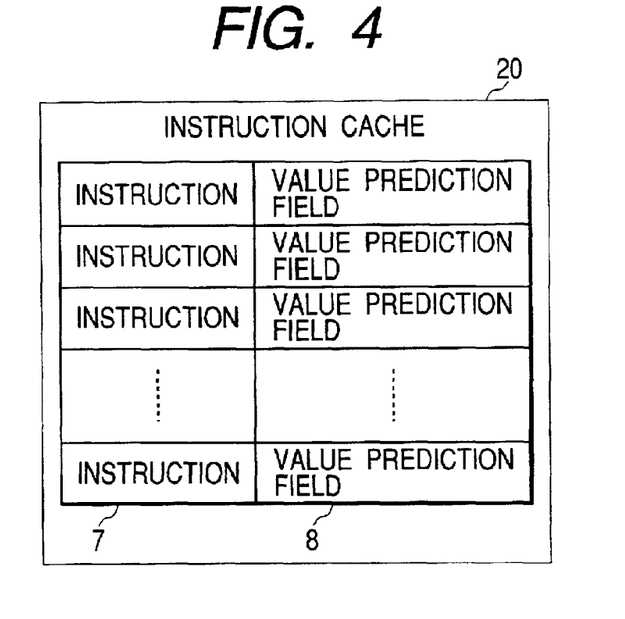
FIG. 4 shows an instruction cache including a value prediction field according to the present invention.

An instruction cache (20) according to another preferred embodiment of the present invention is shown in FIG. 4.

This instruction cache (20) has value prediction fields (8) in addition to instruction fields (7). The value prediction fields are used same as the value prediction field (5) shown in FIG. 1.

Figure 5:
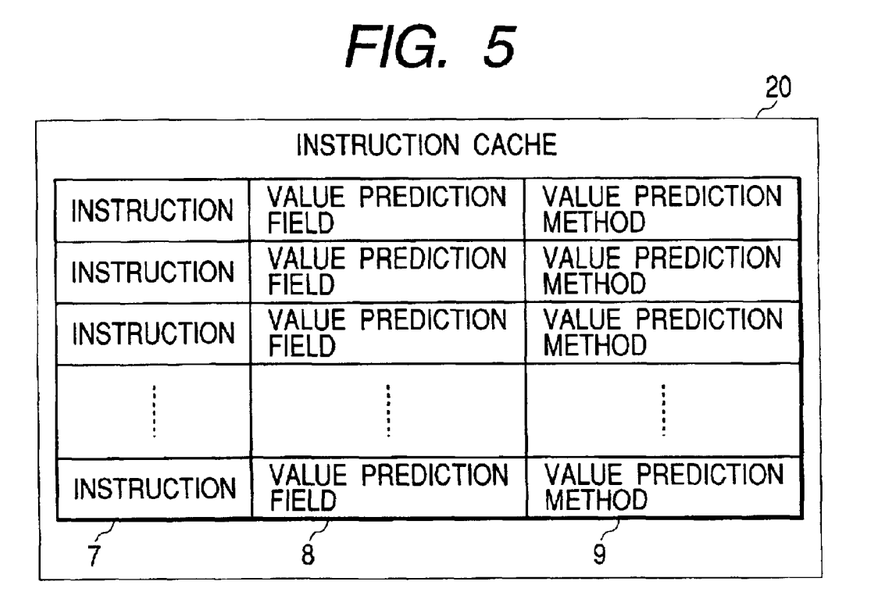
FIG. 5 shows an instruction cache including a value prediction field and a value prediction method field according to the present invention.

FIG. 5 illustrates another instruction cache (20) example wherein value prediction method fields (9) are added to the instructions stored therein. These value prediction method fields (9) are used same as the value prediction method field (6) shown in FIG. 2.

Figure 6:
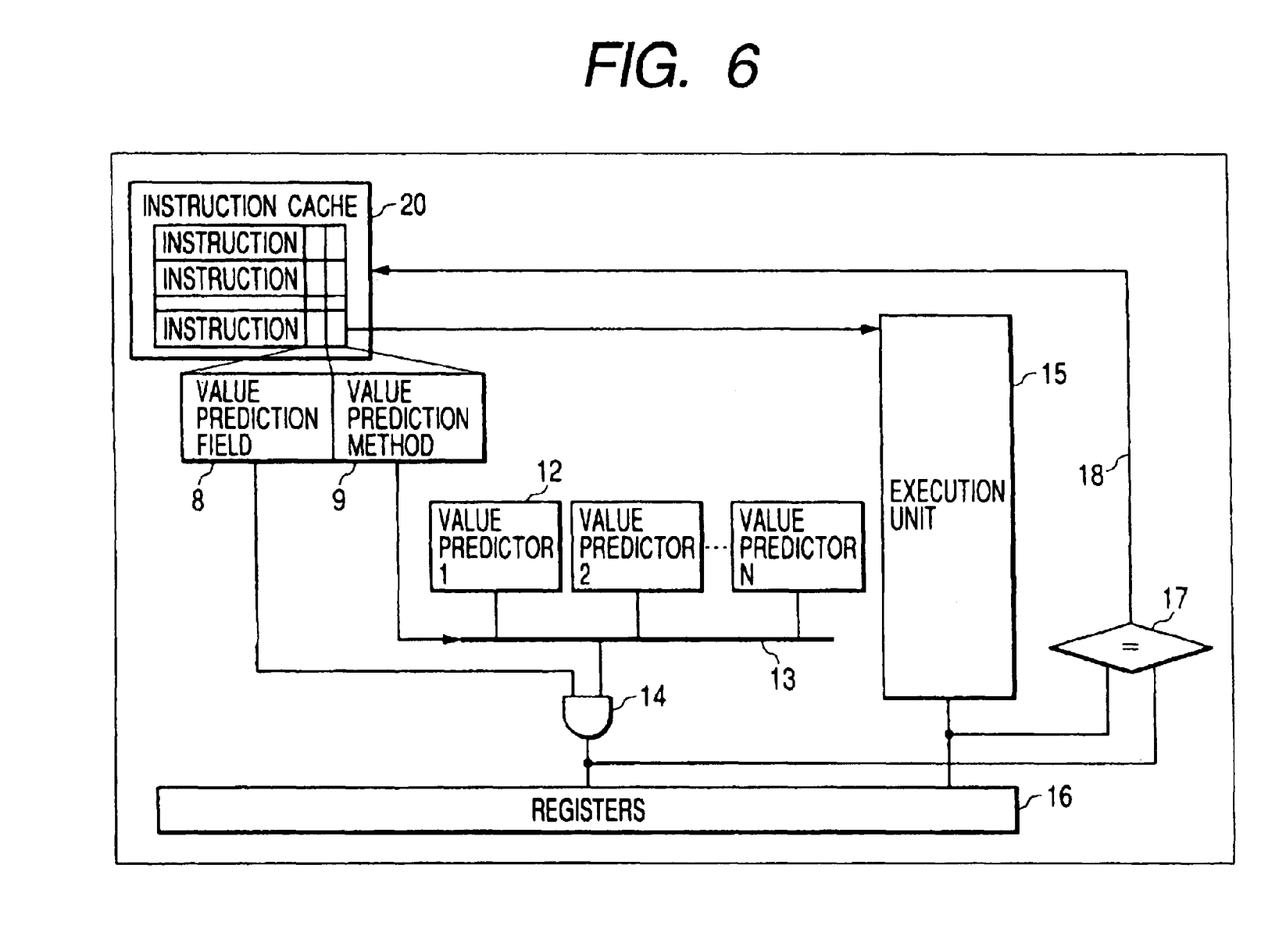
FIG. 6 shows a structural diagram of a computer system including the instruction cache according to the present invention shown in FIG. 5.

FIG. 6 shows a structural diagram of a computer system including the instruction cache (20) shown in FIG. 5. Referring to FIG. 6, the instruction execution procedure in this computer system will be described below.

The computer system is provided with N pieces of value predictors (12) based on different value prediction methods and a selector (13), value prediction masking gate (14), execution unit (15), and register (16), comparator for determining value prediction result (17), and instruction cache (20). Execution of an instruction, using the values contained in the fields except the value prediction field (8) and value prediction method field (9) is conducted by the execution unit (15). The N pieces of value predictors (12) based on different value prediction methods each predict a value that will be given by executing an instruction. Among the results of their prediction, the prediction result produced by the value predictor specified by the value in the value prediction method field (9) is selected by the selector (13).

The predicted value thus selected is made effective or ineffective by the logical AND between the value set in the value prediction field (8) and the value prediction masking gate (14). The predicted value, if effective, is stored into the register (16) and used by the execution unit (15) in executing a subsequent instruction. However, when the execution unit (15) executes the instruction for which the value was predicted and stored, if it produces a result different from the predicted value, the register (16) containing the predicted value is cleared and the subsequent instruction executed by using the predicted value is canceled.

Comparison between the value output by the execution unit (15) and the predicted value for matching is determined by the comparator for determining value prediction result (17). The comparison result is transferred to the instruction cache (20). In the instruction cache (20), for the instruction for which the value was predicated, the data contents of its value prediction field (8) or value prediction method field (9) are updated accordingly. In consequence, when an instruction in the instruction cache (20) is re-executed, a value predictor is selected and whether the predicted value output by the value predictor is valid or invalid is determined, according to the updated contents of these fields.

Figure 7:
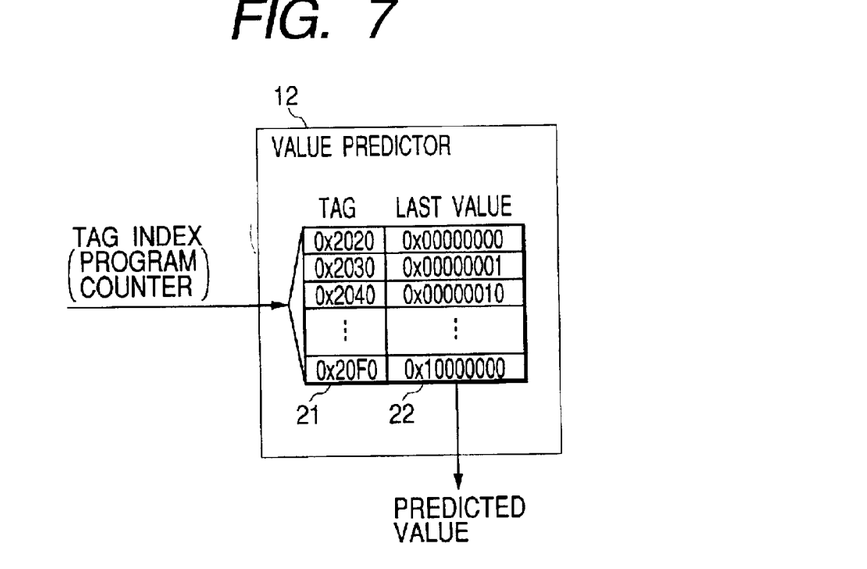
FIG. 7 illustrates a value predictor embodiment example according to the present invention.
Figure 8:
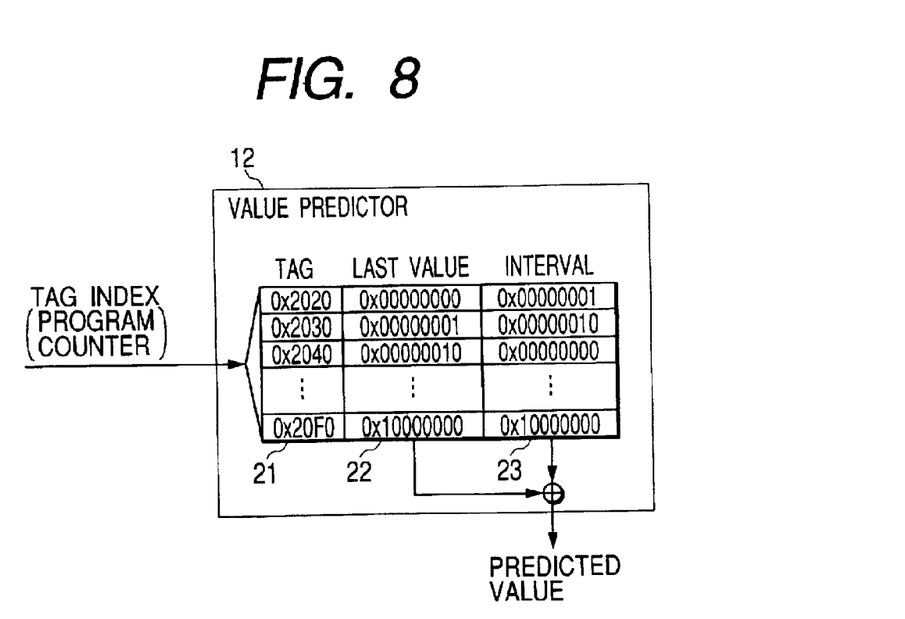
FIG. 8 illustrates another value predictor embodiment example according to the present invention.
Figure 9:
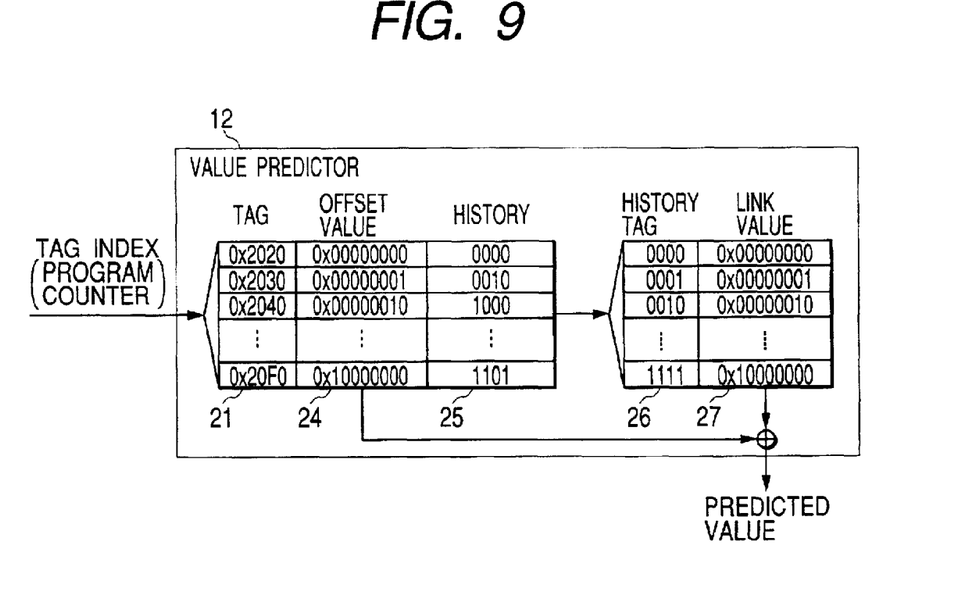
FIG. 9 illustrates yet another value predictor embodiment example according to the present invention.

FIGS. 7, 8, and 9 illustrate embodiment examples of value predictors applicable in the present invention.

The value predictor shown in FIG. 7 is built in accordance with the last value prediction method. For an instruction, the predictor looks at its tag (21) in the table of value prediction, according to the index value in a program counter or the like for identifying each instruction and sets the last value of the tag index as the predicted value. This value predictor correctly predicts a value to be given by instruction execution if prediction for the same tag always gives the same value; that is, the value to be predicted for an instruction is constant. Otherwise, if the value to be predicted for an instruction may vary, correct prediction could not be expected. Nevertheless, the hardware required for this value predictor is small in quantity and thus its installation is simple.

In FIG. 7, in the tag representation such as 0x2020, "x" denotes a hexadecimal number.

FIG. 8 illustrates another value predictor embodiment wherein interval (23) values are added to the last values (22)

of the value predictor shown in FIG. 7 and the predictor sets a predicted value for an instruction by referring to the last value modified by interval. Assuming that Last Value is L and Interval is I, the value of L changes, subject to L=L±I.

This value predictor is capable of correct value prediction for instructions if the value to be predicted increases or decreases at constant intervals as well as if the value is constant which can be predicted correctly by the value predictor shown in FIG. 7. However, if the interval is not constant, correct prediction could not be expected.

The hardware quantity for this value predictor is larger than that of the value predictor shown in FIG. 7.

FIG. 9 illustrates yet another value predictor embodiment based on the two-level prediction method. For an instruction, the predictor looks at its tag (21) in the table of value prediction, according to its index value, and retrieves the associated offset value (24) and history (25). Using the thus obtained history (25), the predictor looks at the history tag (26) and obtains the associated link value (27). The value to be predicted is obtained as the offset value (24) plus the link value (27).

It is advisable to update the history (25), depending on whether or not the result of prediction is correct. If, for example, the history (25) is '0000,' it remains as is if the result of prediction is correct, and changes to '0001' if not.

It is also advisable to update the link value (27), depending on whether or not the result of prediction is correct. If the offset value (24)=1 and the link value=0, the predicted value will be '1.' However, if the actual result of execution is '2,' the link value (27) is updated to '1.'

This value predictor is capable of correct value prediction as well as the value predictors shown in FIGS. 7 and 8 can do. Furthermore, this value predictor is capable of correct value prediction in cases where the value to be predicted is usually constant, but varies for a certain interval. The hardware quantity for this value predictor is larger than that of the value predictors shown in FIGS. 7 and 8, but its feature is generally high probability of correct prediction.

The value predictors shown in FIGS. 7, 8, and 9 are illustratively installed as the value predictors 1 to N shown in FIGS. 3 and 6. In FIGS. 3 and 6, a value predictor that makes eventual value prediction can be selected out of these value predictors each time value prediction is carried out.

Figure 10:
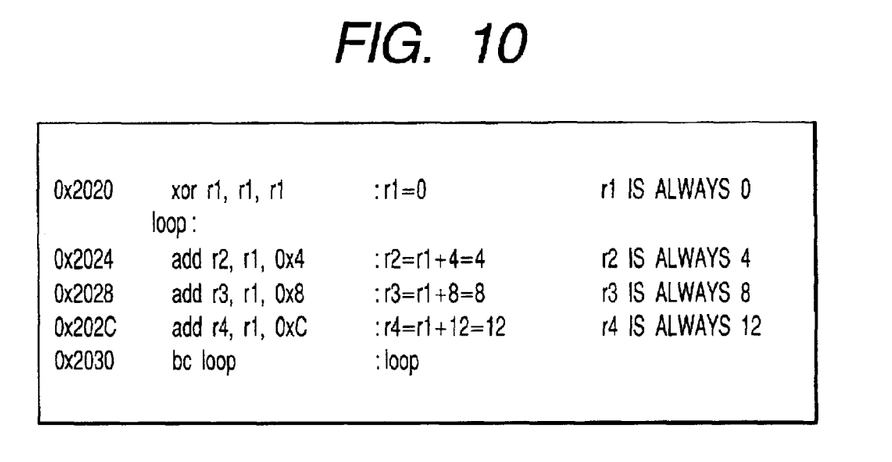
FIG. 10 illustrates a first program example wherein value prediction is effective.
Figure 11:
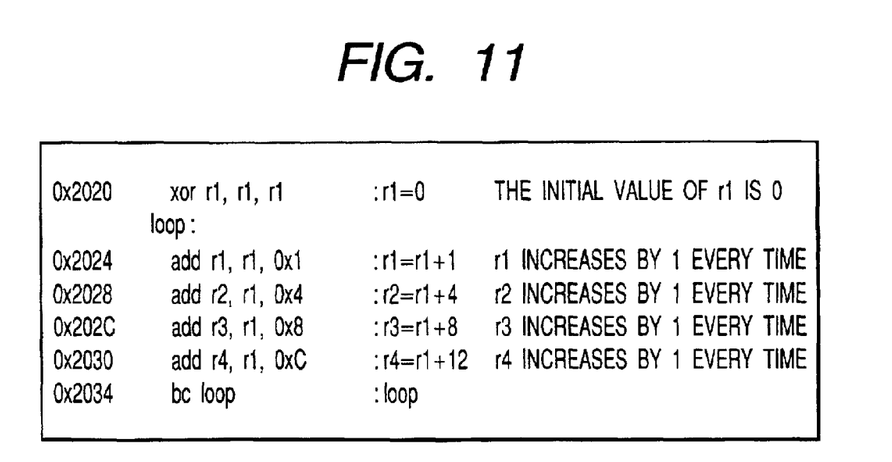
FIG. 11 illustrates a second program example wherein value prediction is effective.
Figure 12:
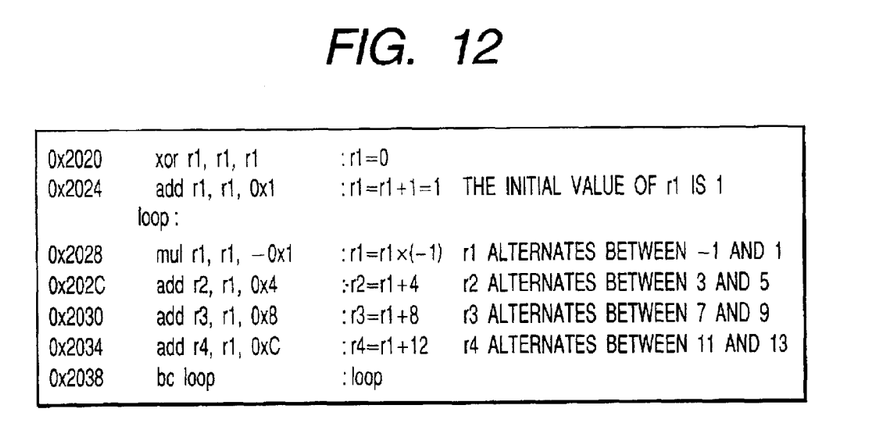
FIG. 12 illustrates a third program example wherein value prediction is effective.

FIGS. 10, 11, and 12 illustrate application examples (part of a program) wherein value prediction functions effectively.

In the application example shown in FIG. 10, at address 0x2020, the value of register r1 is set at 0. In a loop process from address 0x2024 to address 0x2030, the value of r1 is always 0. At address 0x2024, the value of register r2 is always obtained by adding 4 to the value of register r1 and therefore always 4 during the loop process. Similarly, at address 0x2028, the value of register r3 is always 8, and at address 0x202C, the value of register r4 is always 12. Accordingly, these constants are always obtained by executing all instructions at addresses 0x2020, 0x2024, 0x2028, and 0x202C. For these instructions, value prediction is correctly performed by the value predictor shown in FIG. 7.

In the application example shown in FIG. 11, at address 0x2024, the value of register r1 increases by 1 every time the loop process is performed. At address 0x2028, the value of register r2 is obtained by adding 4 to the value of register r1 and therefore increases by 1 every time the loop process is performed. Similarly, at address 0x202C, the value of register r3 increases by 1 every time the loop process is performed, and at address 0x2030, the value of register r4 also increases by 1 every time the loop process is performed.

For the instructions in the application example shown in FIG. 11, the values to be given by executing them cannot be predicted correctly by the value predictor shown in FIG. 7, but can be predicted correctly by the value predictor shown in FIG. 8.

In the application example shown in FIG. 12, at address 0x2028, the value of register r1 alternates between −1 and 1 every time the loop process is performed. At address 0x202C, the value or register r2 is obtained by adding 4 to the value of register r1 and therefore alternates between 3 and 5 every time the loop process is performed. Similarly, at address 0x2030, the value of register r3 alternates between 7 and 9 every time the loop process is performed, and at address 0x2034, the value of register r4 alternates between 11 and 13 every time the loop process is performed.

For the instructions in the application example shown in FIG. 12, the values to be given by executing them cannot be predicted correctly by the value predictors shown in FIGS. 7 and 8, but can be predicted correctly by the value predictor shown in FIG. 9.

Figure 13:
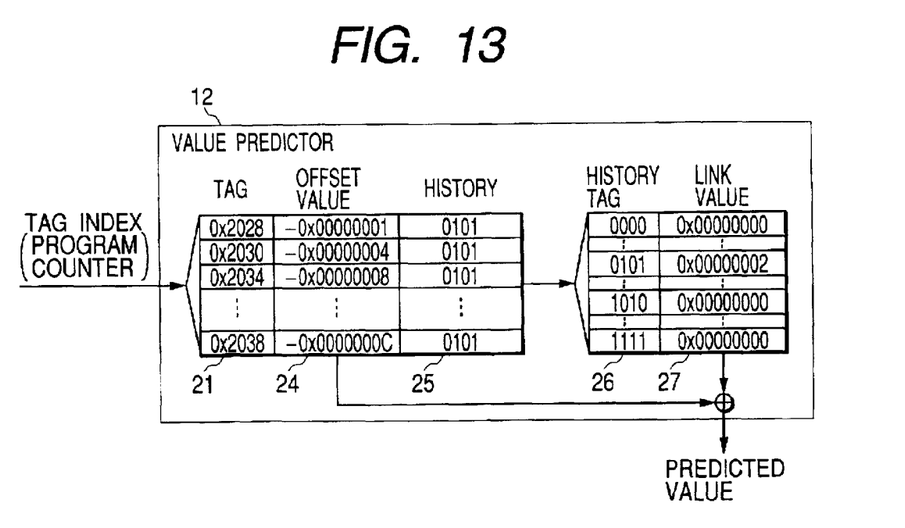
FIG. 13 illustrates a further value predictor embodiment example according to the present invention.

When the value prediction for the program instructions illustrated in FIG. 12 is performed by the value predictor shown in FIG. 9, the value predictor has the values as shown in FIG. 13 in its steady state. In FIG. 13, when the tag is 0x2028, its offset value (24)=−1 with history (25) of '0101' and the associated link value (27)=2, thus giving a predicted value of '1.' If the predicted value is positive, '0' is appended to the tail end of the '0101' contents in the history field (25) and the contents are shifted one place to the left, then the history field (25) comes to contain '1010.' Next time the tag of 0x2028is looked at, its history (25) is '1010' and therefore the link value (27)=0 is retrieved and a negative predicted value of '−1' is obtained.

If the predicted value is negative, '1' is appended to the tail end of the '1010' contents in the history field (25) and the contents are shifted one place to the left, then the history field (25) comes to contain '0101.' Next time the tag of 0x2028 is looked at, its history (25) is '0101' and therefore the link value (27)=2 is retrieved and a positive predicted value of '1' is obtained. In this way, whenever the tag of 0x2028 is looked at, the predicted value changes over between '1' and '−1.'

For the application examples shown in FIGS. 10, 11, and 12, the values of registers r1, r2, r3, and r4 can be determined by compiler program's analyzing the data dependencies in the program. Thus, program execution speedup can be accomplished without using the value predictors. However, for instructions as will be illustrated in FIGS. 14, 15, and 16, wherein load instructions replace the respective instructions at address 0x2020, 0x20202, and 0x2024 in FIGS. 10, 11, and 12, the value of register r1 cannot be determined by static analysis by the compiler program and it is difficult to speed up program execution by the compiler program.

However, the possibility of correct value prediction being carried out by the value predictors is increased by attaching a mark indicating the instruction for which value prediction according to the present invention is to be performed (that is, the value of '1' contained in the value prediction field in the instruction format shown in FIG. 1 or 2) to the instructions below: instructions at addresses 0x2024 to 0x202C in FIG. 14, instructions at addresses 0x2024 to 0x2030 in FIG. 15, and instructions at addresses 0x2028 to 0x2034 in FIG. 16. If, actually, value prediction can be carried out correctly, program execution speedup is accomplished.

Assume that a program for code creation creates code to be executed by a processor, the code comprising instructions formatted as shown in FIGS. 1 or 2. The program for code creation sets values to be contained in the value prediction field (5) and value prediction method field (6) by analyzing the program instructions illustrated in FIGS. 14, 15, and 16 as follows.

Figure 14:
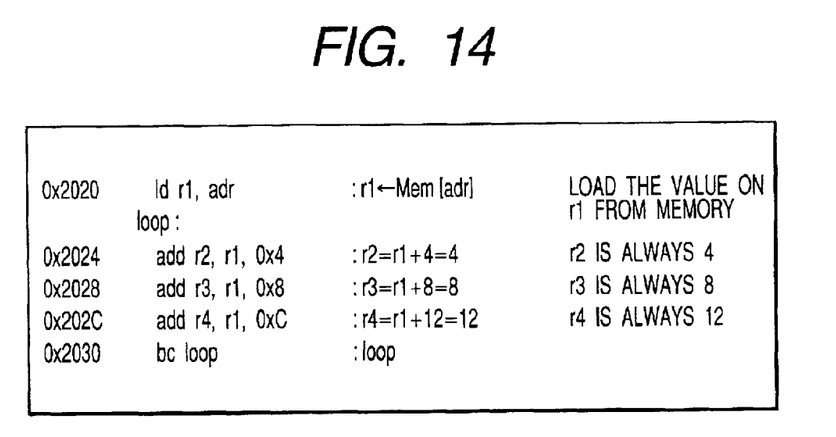
FIG. 14 illustrates a fourth program example wherein value prediction is effective.

Refer to FIG. 14 wherein the value of register r1 is set by the instruction at address 0x2020 which falls outside the loop in the program. Through the analysis by the program for code creation, it is seen that the value of register r1 does not change in the loop. It is also seen that the values of registers r2, r3, and r4 are invariable in the loop because the add instructions at 0x2024, 0x2028, and 0x202C add constants 0x4, 0x8, and 0xC respectively to the value of register r1 and the registers r2, r3, and r4 respectively contain the results of these additions. Thus, correct value prediction can be carried out by the value predictor based on the last value prediction method shown in FIG. 7, wherein the last value is set as the next value to be predicted. Accordingly, the program for code creation sets a value of 1 that enables value prediction in the value prediction field (5) and a value that designates the last value prediction method illustrated in FIG. 7 in the value prediction method field (6).

Figure 15:
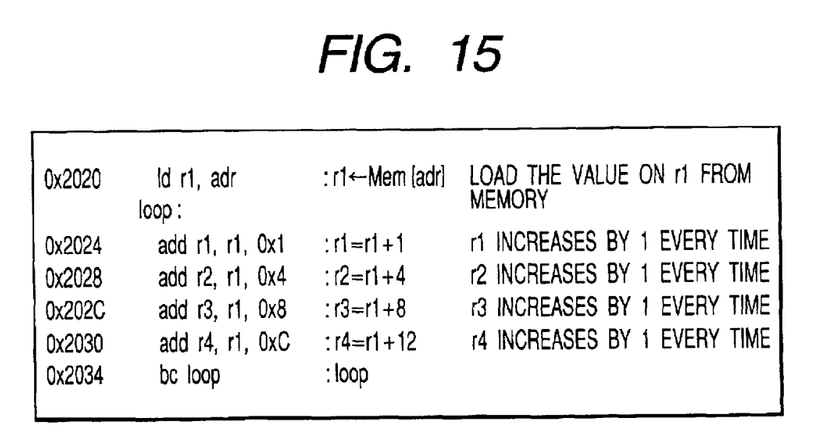
FIG. 15 illustrates a fifth program example wherein value prediction is effective.

Refer to FIG. 15 wherein, through the analysis by the program for code creation, it is seen that the value of register r1 increases by 1 every time the instruction at address 0x2024 is executed within the loop in the program. Thus, correct value prediction can be carried out by the value predictor based on the interval prediction method shown in FIG. 8 wherein a predicted value is obtained by adding a constant value to the last value every time the instruction is executed. Accordingly, the program for code creation sets a value of 1 that enables value prediction in the value prediction field (5) of the instruction at address 0x2024 and a value that designates the interval prediction method illustrated in FIG. 8 in the value prediction method field (6) thereof.

Furthermore, through the analysis by the program for code creation, it is seen that the instructions at addresses 0x2028, 0x202C, and 0x2030 respectively add constant values 0x4, 0x8, 0xC to the value of register r1 which increments by a constant value every time the instruction at 0x2024 is executed and store the sums into registers r2, r3, and r4, respectively. Thus, correct value prediction for the sums to be contained in r2, r3, and r4 can also be carried out by the value predictor based on the interval prediction method shown in FIG. 8 wherein a predicted value is obtained by adding a constant value to the last value every time the instruction is executed. Accordingly, the program for code creation sets a value of 1 that enables value prediction in the value prediction field (5) of the instructions at addresses 0x2028, 0x202C, and 0x2030 and a value that designates the interval prediction method illustrated in FIG. 8 in the value prediction method field (6) thereof.

Figure 16:
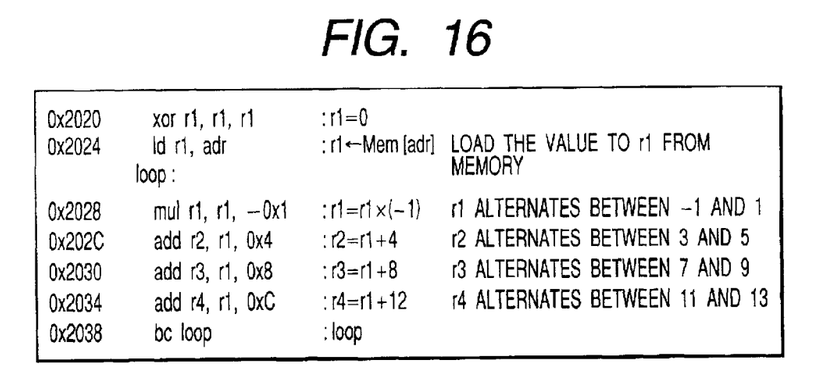
FIG. 16 illustrates a sixth program example wherein value prediction is effective.

Refer to FIG. 16 wherein, through the analysis by the program for code creation, it is seen that the value of register r1 alternates between a positive value and its negative value every time the instruction at address 0x2028 is executed within the loop in the program. Thus, correct value prediction can be carried out by the value predictor based on the tow-level prediction method shown in FIG. 9 wherein the value to be predicted next is determined by the history of the preceding value. Accordingly, the program for code creation sets a value of 1 that enables value prediction in the value prediction field (5) of the instruction at address 0x2028 and a value that designates the two-level prediction method illustrated in FIG. 9 in the value prediction method field (6) thereof.

Furthermore, through the analysis by the program for code creation, it is seen that the instructions at addresses 0x202C, 0x2030, and 0x2034 respectively add constant values 0x4, 0x8, 0xC to the value of register r1 which alternates between a positive value and its negative value and store the sums into registers r2, r3, and r4, respectively. Thus, correct value prediction for the sums to be contained in r2, r3, and r4 can also be carried out by the value predictor based on the two-level prediction method shown in FIG. 9 in the same way as for the value of r1. Accordingly, the program for code creation sets a value of 1 that enables value prediction in the value prediction field (5) of the instructions at addresses 0x202C, 0x2030, and 0x2034 and a value that designates the two-level prediction method illustrated in FIG. 9 in the value prediction method field (6) thereof.

For some kind of processing such as media processing, lowering the accuracy of arithmetic producing true results may be permitted. In such cases, it is possible to determine arithmetic results by value prediction and advance subsequent instruction execution, thereby achieving program execution speedup.

Figure 17:
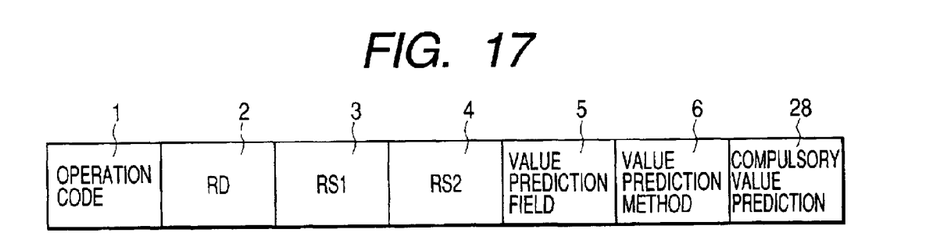
FIG. 17 shows an exemplary instruction format including a value prediction field, value prediction method field, and compulsory value prediction field according to the present invention.

FIG. 17 illustrates an embodiment example of an instruction including a field to contain a flag indicating that the result of value prediction for the instruction is always used. For an instruction with the flag in a compulsory value prediction field 28 shown in FIG. 17, if value prediction for the instruction is succeeded, its result is always used in executing a subsequent instruction.

Figure 18:
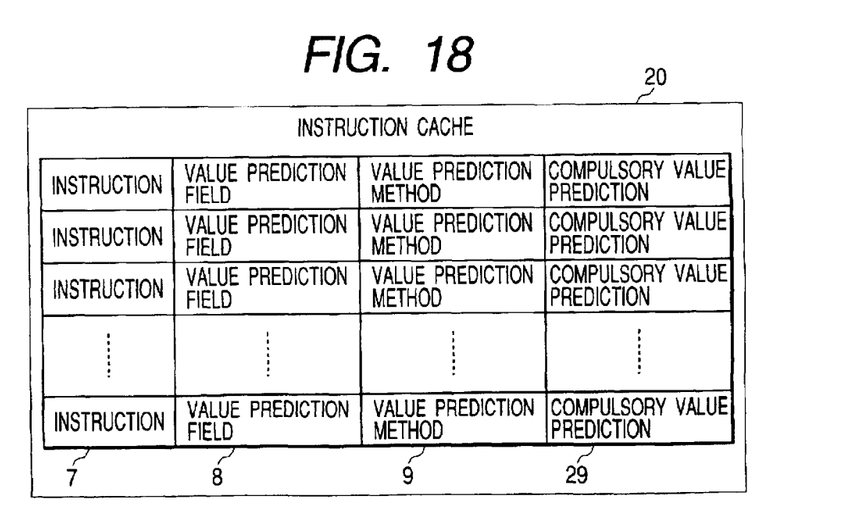
FIG. 18 shows an instruction cache including a value prediction field, value prediction method field, and compulsory value prediction field according to the present invention.

FIG. 18 illustrates an instruction cache embodiment example wherein compulsory value prediction fields (29) of the same function as the above field are added. With a processor provided with this instruction cache, if the result of value prediction for an instruction without the flag in the compulsory value prediction field 29 is stored into a register, it is handled as explained above for FIG. 6. Specifically, when a mismatch between the value output by the execution unit and the predicted value is detected by the comparator for determining value prediction result 17, the result of value prediction contained in the register 16 is cleared and the execution of the subsequent instruction using the result is canceled. On the other hand, the result of value prediction for an instruction with the flag in the compulsory value prediction field 29 is always regarded as correct and used in executing a subsequent instruction.

Even for the latter case, it is possible to configure the processor so that determining a match/mismatch between the value output by the execution unit and the predicted value will be carried out by the comparator for determining value prediction result 17. Specifically, the processor is configured to allow for the following. Even for the result of value prediction for an instruction with the flag in the compulsory value prediction field 29, the comparator for determining value prediction result 17 determines whether it is true or false. If the result of this determination is false, change is made to the information existing in the value prediction method field 8 for the instruction in the instruction cache 20. Alternatively, the processor may be configured to allow for the mode in which an instruction with the flag in the compulsory value prediction field 29 is not executed by the execution unit and determining whether its predicted value is true or false is not carried out by the comparator for determining value prediction result.

Figure 19:
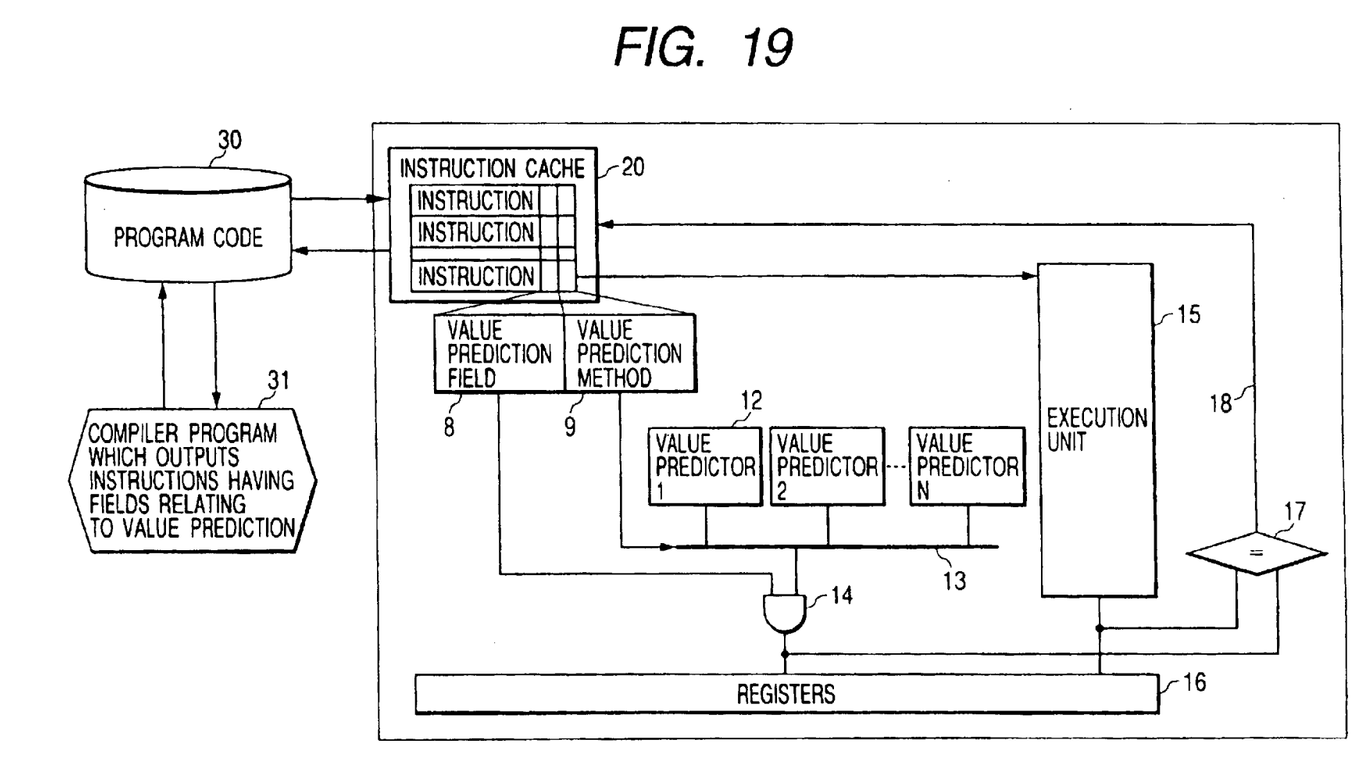
FIG. 19 shows a computer system configuration according to the present invention.

FIG. 19 illustrates a computer system embodiment example in which value prediction according to the present invention is performed. Program code (30) is complied by a compiler program (31) that outputs a sequence of instructions having the fields relating to value prediction of the present invention. These instructions of executable code are stored into the instruction cache (20). When code of an instruction from the instruction cache (20) is executed, a value predictor is selected (12), according to the value contained in its value prediction method field (9). Then, whether the result produced by the value predictor is used is determined (14), according to the value contained in the value prediction field (8). On the other hand, the arithmetic of the instruction is concurrently executed by the execution unit (15). Its result is compared with the result of value prediction (17). The values existing in the fields of the instruction are updated (18) according to the result of the comparison.

According to the present invention, instructions or instruction caches are arranged so that value prediction is applied only to instructions for which enhancing program execution performance is surely achieved by value prediction. Thus, performance lowering by unwanted value prediction can be prevented.

The present invention makes it possible to select a value prediction method required for value prediction with higher accuracy on an instruction-by-instruction basis. Thereby, the performance of a computer system using value prediction can be enhanced to a higher rate.

The present invention may be embodied in other specific forms without departing from the spirit or essential characteristics thereof. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

What is claimed is:

1. A processor comprising means for executing an instruction that includes a field in which a predicted value may be assigned as a mark of enabling that a value as the result of execution of the instruction is predicted prior to or in concurrence with the execution of the instruction and means for provisionally executing a subsequent instruction by using the predicted result, wherein said instruction further includes a field to contain a value that designates a method of predicting said value as the result of execution of the instruction, wherein the predicted result is used in executing a subsequent instruction, regardless of whether the predicted value is true or false.

2. A processor provided with a cache memory to store instructions, wherein, a field in which a value may be assigned as a mark of enabling that a value as the result of execution of the instruction is predicted prior to or in concurrence with the execution of the instruction and a subsequent instruction is provisionally executed by using the predicted result is attached to each instruction stored into the cache memory, wherein a field to contain a value that designates a method of predicting a value as the result of execution of the instruction is further attached to each instruction stored into the cache memory, for using the predicted result in executing a subsequent instruction, regardless of whether the predicted value is true or false, and is further attached to each instruction stored into the cache memory.

3. A processor as recited in claim 2, wherein the processor includes means for updating the values existing in the fields provided for each instruction stored into the cache memory, depending on whether the predicted value as the result of execution of the instruction is true or false.

4. A processor comprising:

a cache memory to store an instruction to which a first field is attached, the first field in which a value may be assigned as a mark of enabling that a value as the result of execution of the instruction is predicted prior to or in concurrence with the execution of the instruction and a subsequent instruction is provisionally executed by using the predicted result;

execution means which fetches an instruction from the cache memory and executes the instruction;

value prediction means which predicts a value as the result of execution of an instruction prior to or in concurrence with the execution of the instruction;

gating means which enables outputting the result of prediction made by said value prediction means only for an instruction with said mark contained in its first field so as to be used in executing a subsequent instruction;

storage means which stores the predicted result of execution of an instruction passed through said gating means and the result of executing the instruction by said execution means for further processing;

means for determining a match/mismatch between the result of prediction made by said value prediction means and the result of instruction execution by said execution means for each instruction to be executed, wherein a third field is attached to an instruction to be stored into said cache memory, the third field in which a value may be assigned as a mark of enabling that the result of prediction made by said value prediction means is used in executing a subsequent instruction, regardless of whether the predicted value is true or false, wherein the result of prediction for an instruction without the mark contained in the third field, made by said prediction means, and the result of execution of a subsequent instruction by using the result of prediction are nullified when said means for determining a match/mismatch has determined a mismatch for the instruction, whereas the result of prediction for an instruction with the mark contained in the third field, made by said prediction means, is taken to be valid.

5. A processor as recited in claim 4, wherein a second field is further attached to an instruction to be stored into said cache memory, the second field to contain a value that designates a method of predicting the result of execution of the instruction, and said value prediction means predicts the result of execution of each instruction by using the prediction method designated by the contents of the second field of the instruction.

6. A processor as recited in claim 5, further comprising means for updating the contents of the first field or the second field of an instruction stored in the cache memory if the means for determining a match/mismatch has determined a mismatch for the instruction.

* * * * *